June 28, 1932. A. BARÉNYI 1,865,078
PHOTOGRAPHIC SHUTTER
Filed July 8, 1929  4 Sheets-Sheet 1

INVENTOR
Árpád Barényi
by
Franz Reichow
Attorney

June 28, 1932.  A. BARÉNYI  1,865,078
PHOTOGRAPHIC SHUTTER
Filed July 8, 1929  4 Sheets-Sheet 2

INVENTOR
Árpád Barényi
by Franz Reichow
Attorney

June 28, 1932.  A. BARÉNYI  1,865,078
PHOTOGRAPHIC SHUTTER
Filed July 8, 1929  4 Sheets-Sheet 3

INVENTOR
Árpád Barényi
by
Franz Neuhold
Attorney

INVENTOR
Árpád Barényi
by
Frank Reichod
Attorney

Patented June 28, 1932

1,865,078

UNITED STATES PATENT OFFICE

ÁRPÁD BARÉNYI, OF BERLIN-LICHTERFELDE, GERMANY

PHOTOGRAPHIC SHUTTER

Application filed July 8, 1929, Serial No. 376,518, and in Germany July 16, 1928.

My invention relates to improvements in photographic shutters, and more particularly in shutters of the type comprising a set of crescent-shaped disks rotatably mounted around the central opening in which the lens system is mounted and adapted to overlap the said opening for completely closing the same. The object of the improvements is to provide a shutter of this type in which the velocity of opening and closing the camera is high. With this object in view my invention consists in providing operating mechanism by means of which the said shutter disks are rotated for opening and closing the camera at a velocity which is continuously accelerated from the beginning of the opening movement to the end of the closing movement. Further, the driving mechanism for the disks is constructed so that its resistance is reduced to a minimum.

Figure 8:
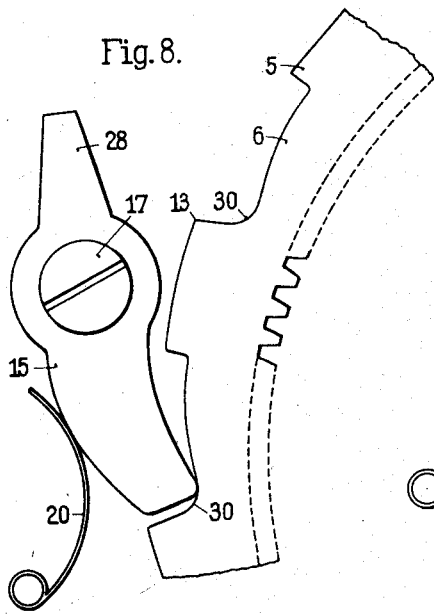
Figure 9:
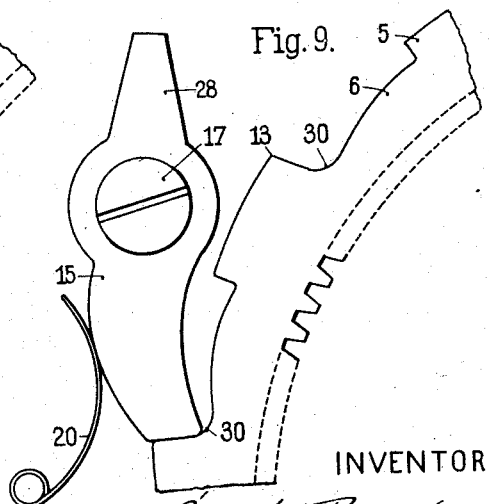
Figure 10:
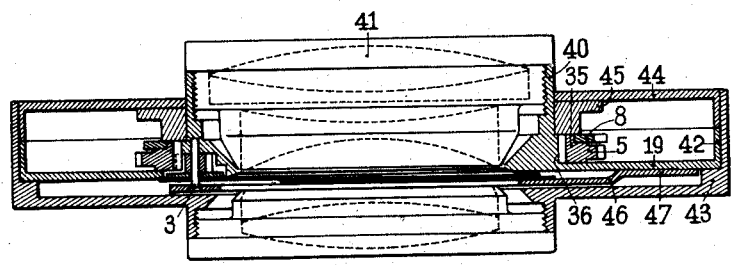
Figure 11:
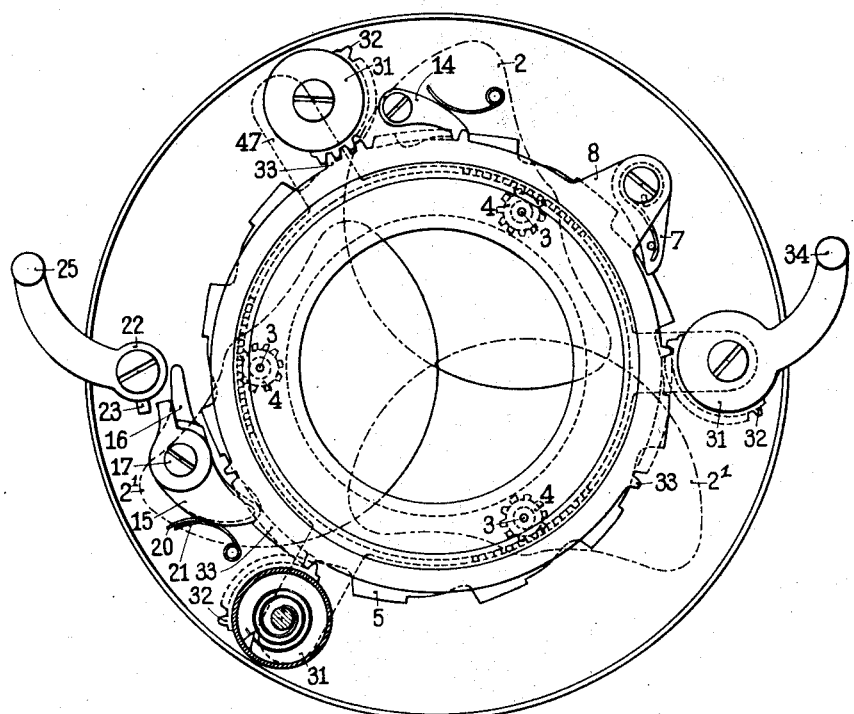
Figure 12:
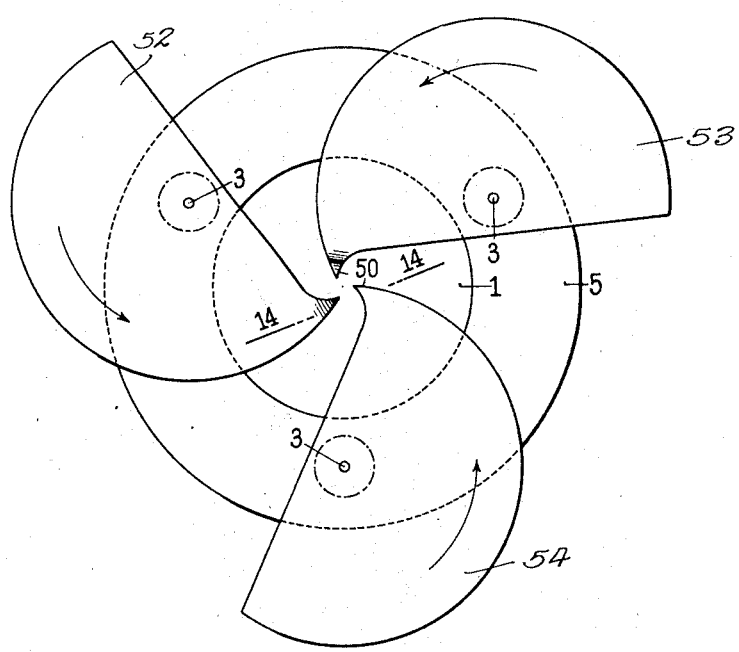
Figure 13:
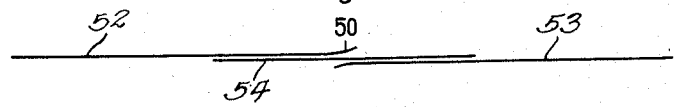
Figure 14:

For the purpose of explaining the invention several examples embodying the same have been shown in the accompanying drawings, in which the same letters of reference have been used in all the views to indicate corresponding parts. In said drawings, Figs. 1 to 6 are diagrammatical elevations showing a shutter comprising three crescent-shaped shutter disks, the said disks being illustrated in six different positions, Fig. 7 is an elevation of the shutter showing the operating mechanism, Figs. 8 and 9 are detail views on an enlarged scale showing a part of the operating mechanism, Fig. 10 is a sectional plan view showing a modification of the shutter, Fig. 11 is an elevation of the shutter illustrated in Fig. 10, Fig. 12 is a diagrammatical elevation showing a modification of the construction of the shutter disks, Fig. 13 is a diagrammatical plan view showing the shutters illustrated in Fig. 12, and Fig. 14 is a diagrammatical sectional view taken on the line 14—14 of Fig. 13.

Figure 1:
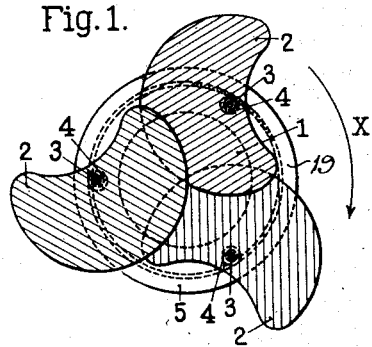
Figure 2:
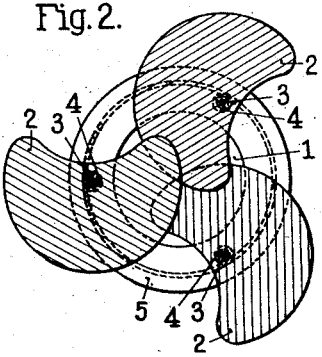
Figure 3:
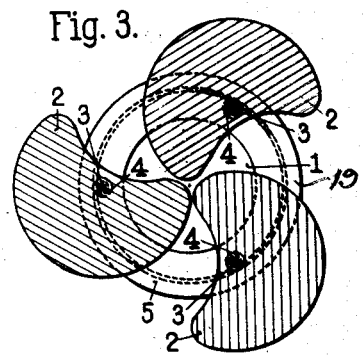
Figure 4:
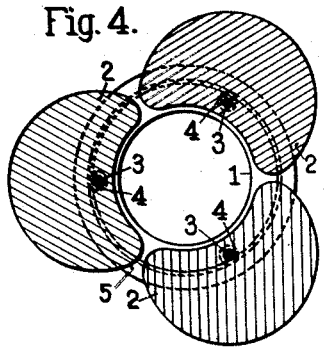
Figure 5:
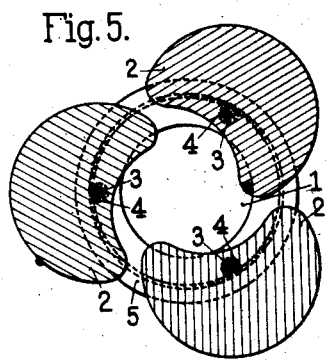
Figure 6:
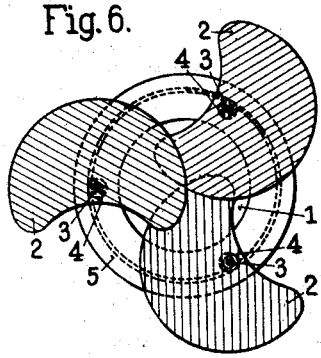

In the example shown in Figs. 1 to 6 the shutter comprises a circular plate 19 having a large circular opening 1 through its center. On pivot bolts 3 mounted on the plate 19 crescent-shaped shutter disks 2 are mounted, and to the said disks pinions 4 are secured which are in mesh with an internal gear wheel 5. By rotating the gear wheel 5 in the direction of the arrow $x$ shown in Fig. 1 all the shutter disks 2 are rotated about their pivot bolts 3 in the same direction, and the operating mechanism of the gear wheel 5 is such that upon each operation a complete rotary movement is imparted to the shutter disks. In the normal position shown in Fig. 1 the shutter disks 1 overlap one another at the margin and at the center of the opening 1, and when rotating the same they uncover the opening 1 at first at the margin, as is shown in Fig. 2, and when further rotating the same the uncovered parts of the opening 1 are gradually increased inwardly until the opening is completely uncovered, as is shown in Fig. 4. When further rotating the shutter disks in the same direction the opening is gradually covered by the shutter disks from the margin inwardly, as is shown in Figs. 5 and 6, Fig. 6 showing the opening covered by the shutters except small marginal portions. At the end of the rotation the shutter disks are in the position shown in Fig. 1. By thus operating the shutter disks all the marginal parts of the lens system are laid open a length of time such that all the image forming parts receive practically the same amount of light.

Figure 7:
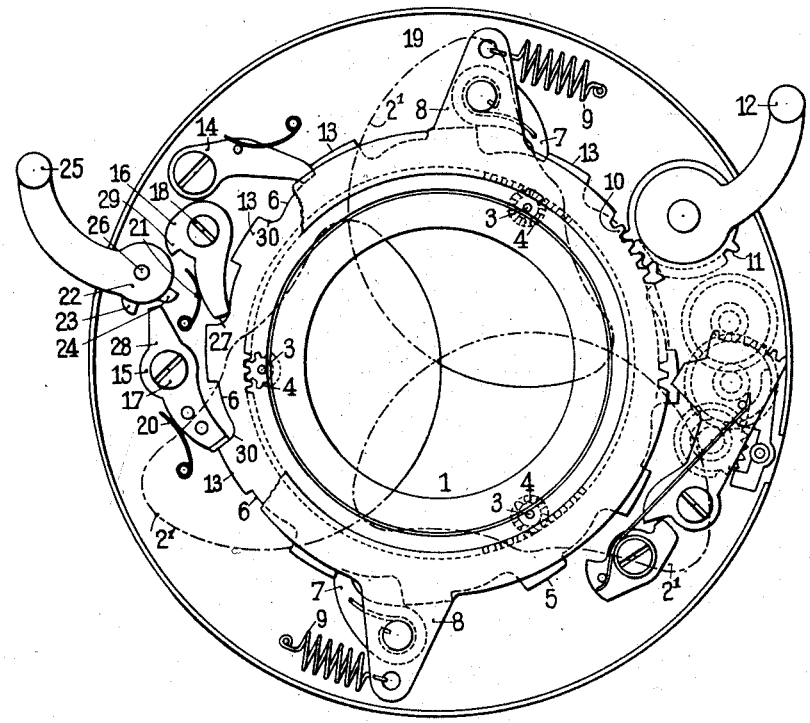

In the construction of the shutter shown in Fig. 7 the shutter disks $2^1$ are slightly different in form, the form of the disks being determined by the dead movement of the disks caused by the brake connected with the mechanism. Brakes for shutters are known in the art, and the construction of the brake does not form a part of my invention, and therefore I deem it not necessary to show the same in the drawings.

The construction of the driving mechanism comprising the pinions 4 and the internal gear wheel 5 is such that after putting the shutter under tension and releasing the same, a complete rotation is imparted to the shutter disks. The internal gear wheel 5 is provided at its outer circumference with recesses 6 adapted to be engaged by pawls 7 rockingly mounted on a ring 8 disposed concentrically above the gear wheel 5. The said ring is acted upon by springs 9 tending to rotate the same in the same direction. For example, if the internal gear wheel 5 has ninety-six teeth, and the pinion 3 eight teeth, the gear ratio is 1:12, and one-twelfth rotation of the internal gear wheel imparts a complete rotation to the pinions 4 and the disks $2^1$ connected therewith. Therefore the gear wheel 5 is provided with twelve recesses 6. For putting the operating mechanism under tension the ring 8 is provided with teeth 10 engaged by a toothed segment 11 adapted to be rocked by means of a lever 12 projecting from the casing enclosing the shutter mechanism. After each exposure of the shutter the ring 8 is rocked one step by means of the toothed segment 11 for putting the springs 9 under tension, the pawls 7 riding on the projecting parts 13 and engaging in the next recesses 6. In the meantime the gear wheel 5 is locked in position by means of a pawl 14 preventing the transmission of the rocking movement of the ring 8.

On pivot bolts 17, 18 secured to the plate 19 two pawls 15 and 16 are rockingly mounted, which pawls are acted upon by springs 20 and 21 rocking the same into the recesses 6 of the gear wheel 5, the pawls 15 and 16 preventing rocking movement of the gear wheel by the springs 9 and the pawls 7. Suitable mechanism is provided for rocking the pawls 15 and 16 outwardly, and as shown the said mechanism comprises a cam 22 carrying two lugs 23 and 24 adapted for engagement respectively with a heel 28 made integral with the pawl 15 and a nose 29 made integral with the pawl 16. The cam 22 is mounted on a pin 26 secured to the plate 19, and it is provided with a releasing arm 25 projecting outwardly through the wall of the shutter casing. The pawl 16 is slightly reduced in length as compared to the pawl 15, so that there is a slight clearance 27 between the same and the wall of the recess 6. The lugs 23, 24 are located on the cam 22 so that the lug 23 engages the heel 28 before the lug 24 engages the nose 29. Therefore, when operating the arm 25 the lug 15 is first rocked out of locking engagement with the gear wheel 5, whereupon a slight initial rotary movement is imparted to the gear wheel permitting the pawl 16 to engage the wall of the recess 6. When further rocking the arm 25 the pawl 15 is released by the lug 23, and it is rocked by the spring 20 on the outer circumference of the projecting part 13 of the gear wheel 5. When further rocking the arm 25 the lug 24 engages the nose 29 and rocks the pawl out of the recess 6, whereupon the gear wheel 5 is rotated by the ring 8 and the pawls 7 through an angle corresponding to one twelfth of the circumference of the gear wheel. The pawl 15 engages the next recess 6, and it arrests the gear wheel 5 by engaging the end wall of the said recess.

In order to reduce the blow of the gear wheel impinging on the pawl 15 the bottom wall of the recess 6 merges into the end wall thereof by a curve 30, as is best shown in Figs. 8 and 9. Therefore, the pawl 15 rides on the said curved part 30 so that it has a braking action and gradually engages the end wall of the recess.

In the modification shown in Figs. 10 and 11 in lieu of the springs 9 three spring barrels 31 are provided which are provided with toothed rims 32 engaging corresponding gear teeth 33 of the ring 8. One of the said spring barrels is provided with an arm 34 for putting the mechanism under tension.

The plate 19 is made integral with a cylinder or barrel 40 for the accommodation of the lens system 41 shown in Fig. 10 in dotted lines, and it is made integral with a flange 42. The plate 19 and cylinder 40 are mounted in a barrel 43 and they are held in position therein by means of an annular disk 44. The gear wheel 5 is rotatably mounted on the cylinder 40 and it is held in position by means of a ring 45. The pivot bolts 3 of the shutter disks are fitted in bores of the cylinder 40, and they are steadied by a ring 46 secured to the plate 19 by arms 47.

The ring 8 is mounted on the hub 35 of the gear wheel 5. Thus the lateral pressure acting on the tubular member 36 projecting from the plate 19 is reduced to a minimum. The pawls 15 and 16 are mounted on common pivot bolts 17, and the cam 22 is provided with a single lug 23 adapted successively to engage heels made integral with the said pawls 15 and 16. Thus room is saved for disposing other parts on the plate 19 such for example as mechanism for performing bulb and time exposures.

The shutter disks 2 and $2^1$ must be mounted for being in close contact with each other when covering the opening 1. Therefore they are liable to engage one another with their meeting edges when closing the opening 1, so that they arrest one another before arriving in closing position. Therefore the said shutter disks are formed at their leading edges with points 50 meeting one another when closing the apparatus in the center of the opening 1, as is shown in Figs. 12 to 14, where the said disks have received the reference characters 52, 53 and 54. I have found that thereby catching of the disks is prevented, and that the disks properly place themselves one above the other. Preferably the points of the inner and outer shutters are slightly bent respectively inwardly and outwardly, as is shown in Fig. 13, and they may be sharpened in the manner shown in Fig. 14. The merging edges of the points 50 and the disks 2 are rounded.

The operation of the shutter is as follows: Normally the shutter disks are in the position shown in Figs. 1 and 7. For putting the operating mechanism under tension the arm 12 is rocked in clockwise direction thus rocking the ring 8 in anti-clockwise direction and putting the springs 9 or the springs confined within the barrels 31 under tension. The pawl 7 rides on the projecting parts 13 of the gear wheel 5, which gear wheel is locked in position by the pawl 14 preventing the gear wheel to be carried along by the ring 8. At the end of the rocking movement of the ring 8 the pawl 7 engages in one of the recesses 6 thus coupling the ring 8 with the gear wheel 5. Rotary movement of the gear wheel is prevented by the pawl 15 engaging in one of the recesses 6.

If it is desired to make an exposure the arm 25 is rocked in anti-clockwise direction. The lug 23 engages the heel 28 and rocks the pawl 15 out of the recess 6, and immediately thereafter it releases the said pawl, which is therefore pressed inwardly by the spring 20 and on the surface of the portion 13. In the meantime the gear wheel 5 has performed a slight rotary movement until the pawl 16 engages the end wall of its recess 6. Immediately thereafter the lug 24 engages the nose 29 and rocks the pawl 16 out of the recess 6. Now the gear wheel is further rotated by the spring 9 until the pawl 15 engages the end wall of the next recess 6. The rotary movement of the gear wheel is transmitted by the pinions 3 to the disks 2 which open and close the opening 1 in the manner described with reference to Figs. 1 to 6.

When the gear wheel 5 has been released by the second pawl 16 it is rotated by the springs 9 or the springs confined within the spring barrels 31, and the said transmission of power is not impeded by any brake mechanism, until the shutters arrive in closing position, whereupon the kinetic energy of the parts is consumed by the pawl 15 engaging the rounded portion 30 of the recess 6.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. A photographic shutter, comprising a support having an opening for the passage of the light rays, overlapping shutter disks each having a fixed center of rotation, pinions connected with said disks, a gear wheel engaging said pinions, a power operated ring disposed concentrically of said gear wheel, mechanism loosely connecting said ring and gear wheel for transmitting rotary movement from said ring to said gear wheel, and means for controlling the rotary movement of said power operated ring.

2. A photographic shutter, comprising a support having an opening for the passage of the light rays, overlapping shutter disks each having a fixed center of rotation, pinions connected with said disks, a gear wheel engaging said pinions, a power operated ring disposed concentrically of said gear wheel, mechanism for transmitting rotary movement from said ring to said gear wheel, said ring being formed with external gear teeth, a gear wheel engaging said gear teeth for rotating said ring in a direction for storing power, and means controlling the transmission of rotary movement from said ring to said gear wheel.

3. A photographic shutter, comprising overlapping shutter disks each rotatably mounted on an axis disposed transversely of the disk, a rotary ring for imparting rotary movement to said disks, means for rotating said ring in a direction for imparting opening and closing movement to said disks, and locking means for said ring comprising a pair of locking members adapted for successive locking engagement with said ring, automatic means tending to throw said locking members into locking engagement with said ring, and means for successively throwing said locking members out of locking engagement with said ring and releasing the locking member which first has been thrown out of locking engagement before the other locking member is thrown out of locking engagement.

4. A photographic shutter, comprising overlapping shutter disks each rotatably mounted on an axis disposed transversely of the disk, a rotary ring for imparting rotary movement to said disks and formed with ratchet teeth, means for rotating said ring in a direction for imparting opening and closing movement to said disks, and locking means for said ring comprising a pair of spring-pressed pawls adapted for successive locking engagement with said ratchet teeth, and means for successively throwing said pawls out of locking engagement with said ratchet teeth and releasing the same.

5. A photographic shutter, comprising overlapping shutter disks each rotatably mounted on an axis disposed transversely of the disk, a rotary ring for imparting rotary movement to said disks, means for rotating said ring in a direction for imparting opening and closing movement to said disks, and locking means for said ring comprising ratchet teeth formed on said ring, a locking pawl adapted for engagement with said ratchet teeth, and means for throwing said pawl into and out of locking engagement with said ratchet teeth, the leading faces of said ratchet teeth being rounded forwardly at their inner parts.

6. A photographic shutter, comprising overlapping shutter disks rotatable on axes disposed transversely of the disks, a rotary ring operatively connected with said disks for imparting rotary movement thereto, a plurality of springs acting on said ring and symmetrically disposed around the same, and means for putting the springs under tension and rotating said ring in a direction for controlling the transmission of rotary movement from said ring to said disks.

7. A photographic shutter, comprising overlapping shutter disks rotatable on axes disposed transversely of the disks, a rotary ring operatively connected with said disks for imparting rotary movement thereto, a plurality of spring barrels acting on said ring and symmetrically disposed around the same, and means for putting the spring barrels under tension and rotating said ring in a direction for controlling the transmission of rotary movement from said ring to said disks.

8. A photographic shutter, comprising overlapping shutter disks rotatable on axes disposed transversely of the disks, pinions connected with said disks, a gear wheel engaging said pinions, a ring having said gear wheel mounted on its hub, an operative connection between said ring and gear wheel, and means for rotating said ring in a direction for imparting rotary movement to said gear wheel.

9. A photographic shutter, comprising overlapping shutter disks rotatably mounted on transverse axes, and means for rotating said disks, said disks being provided at their leading parts with sharp edges.

10. A photographic shutter, comprising overlapping shutter disks rotatably mounted on transverse axes, and means for rotating said disks, said shutters being formed at their leading parts with pointed tongues.

11. A photographic shutter, comprising overlapping shutter disks rotatably mounted on transverse axes, and means for rotating said disks, said shutters being formed at their leading parts with pointed tongues the margins of which merging into the margin of the bodies of the disks are rounded.

12. A photographic shutter, comprising overlapping shutter disks rotatably mounted on transverse axes, and means for rotating said disks, said shutters being formed at their leading parts with pointed tongues, said disks having their leading parts bent away from one another.

13. A photographic shutter, comprising a support having an opening for the passage of the rays, overlapping shutter disks each rotatable on said support on an axis disposed transversely of its plane, means for imparting accelerated opening and closing movement to said disks, and retarding and arresting means for said disks operative after the opening has been closed.

14. A photographic shutter, comprising a support having an opening for the passage of the light rays, overlapping shutter disks each having a fixed centre of rotation, pinions connected with said disks, a gear wheel engaging said pinions, a power operated ring disposed concentrically of said gear wheel, pawl and ratchet mechanism for transmitting rotary movement from said ring to said gear wheel, and means for controlling the rotary movement of said power operated ring.

15. A photographic shutter, comprising overlapping shutter disks each rotatably mounted on an axis disposed transversely of the disks, a rotary ring for imparting rotary movement to said disks and formed with ratchet teeth, means for rotating said ring in a direction for imparting opening and closing movement to said disks, and locking means for said ring comprising a pair of spring-pressed pawls mounted on the same pivot bolt and adapted for successive locking engagement with said ratchet teeth, and means for successively throwing said pawls out of locking engagement with said ratchet teeth and releasing the same.

In testimony whereof I hereunto affix my signature.

ÁRPÁD BARÉNYI.